(12) United States Patent
Berkner et al.

(10) Patent No.: US 7,330,608 B2
(45) Date of Patent: Feb. 12, 2008

(54) SEMANTIC DOCUMENT SMARTNAILS

(75) Inventors: Kathrin Berkner, Santa Clara, CA (US); Jinghao Miao, Fremont, CA (US)

(73) Assignee: Ricoh Co., Ltd., Tokyo (JP)

( * ) Notice: Subject to any disclaimer, the term of this patent is extended or adjusted under 35 U.S.C. 154(b) by 107 days.

(21) Appl. No.: 11/023,142

(22) Filed: Dec. 22, 2004

(65) Prior Publication Data

US 2006/0136491 A1    Jun. 22, 2006

(51) Int. Cl.
*G06K 9/32* (2006.01)
(52) U.S. Cl. .................. 382/298; 382/176; 382/305; 715/526
(58) Field of Classification Search ............ 382/176, 382/181, 282, 284, 291, 298, 305, 313; 358/451; 707/103 R; 345/676; 715/517, 526; 348/561, 348/581
See application file for complete search history.

(56) References Cited

U.S. PATENT DOCUMENTS 5,625,767 A * 4/1997 Bartell et al. ............... 345/440
5,781,879 A * 7/1998 Arnold et al. ................. 704/9
6,598,054 B2 * 7/2003 Schuetze et al. ........ 707/103 R
6,778,970 B2 * 8/2004 Au .............................. 706/55
7,069,506 B2 * 6/2006 Rosenholtz et al. ........ 715/526
2003/0014445 A1 * 1/2003 Formanek et al. .......... 707/526

OTHER PUBLICATIONS

Zhao, et al (Narrowing the Semantic Gap-Improved Text-Based Web Document Retrieval Using Visual features), IEEE, pp. 189-200.*

* cited by examiner

*Primary Examiner*—Daniel Mariam
(74) *Attorney, Agent, or Firm*—Blakely, Sokoloff, Taylor & Zafman LLP

(57) ABSTRACT

A method and apparatus is disclosed herein for generating visualizations of documents based on semantic information. In one embodiment, the method comprises selecting a plurality of image segments having a plurality of attributes that includes a semantic importance information for each of the plurality of document image segments and determining a plurality of positions and a plurality of geometric operations to be performed on the plurality of document image segments according to the plurality of attributes and display constraints.

62 Claims, 11 Drawing Sheets

SEMANTIC DOCUMENT SMARTNAILS

FIELD OF THE INVENTION

The present invention relates to the field of image processing; more particularly, the present invention relates to generating thumbnails for documents in which the content is based on semantic information.

BACKGROUND OF THE INVENTION

With improved display technology, increasing mobile computing and data storage capabilities, the trend exists on increasing the amount of image information shown on physical and virtual displays of smaller and smaller size, such as handheld devices, cell phones, browser windows and thumbnails. Such a display of image information requires reformatting originally stored images, often called repurposing.

The increasing popularity of handheld devices, such as PDA and cell phones, with constrained display sizes demands a technology to represent documents in a proper way such that users are able to retrieve them effectively and efficiently. A big problem is that traditional thumbnails are created by only scaling the original documents into a small size, and do not consider the readability of the information contained in those documents. Thus, given a scanned document, resizing of the entire document to a target display (hereinafter referred as canvas) by downsampling often results in loss of readability of text and recognizability of image features.

There are many prior art techniques related to reformatting documents and images to fit the small display devices. Prior art includes Breuel's method that reflows a single page of a document image to a PDA by filling the content information into the width of the PDA display and allow scrolling the content in the vertical direction. For more information, see Breuel, "Paper to PDA," Proceedings of IAPR 16th Int'l Conf. on Pattern Recognition, pp. 476-479, 11-15August, Quebec City, Canada. However, the technique is problematic for thumbnail creation for a number of reasons. First, the technique cannot be used for generating fixed size thumbnails since it may require scrolling through a document. Allowing scrolling means that no constraints are given to the vertical direction. As a consequence, all content can be shown and there is no need for selection of components. Second, this technique does not include results of a semantic document analysis.

On the other hand, some researchers have focused on representing semantic document information. Woodruf developed an enhanced thumbnail technology to locate keyword information, and paste color coded text rendered at a large point size onto the keyword location in the thumbnail changing the appearance of the original image segments in which keywords appeared. However, Woodruf did not solve the readability problem for image segments cropped out of the original document image containing keywords or sentences surrounding keywords. For more information, see Woodruf, "Using Thumbnails to Search the Web," Proceedings of SIGCHI'2001, Mar. 31-Apr. 4, 2001, Seattle, Wash.

Based on Woodruf technology, Suh introduced an overview-plus-detail interface to present documents. With the interface, users are given both a downsampled document image as an overview, and pop-up windows as a detailed view zooming into the specific portions containing keywords. Keywords are also pasted onto the document overview image. Therefore, a transition from an overview representation to a detailed representation is achieved. In the overview of document images, the readability is not dealt with because with the help of detailed pop-up view, the user is able to read some portions of the document containing keywords. No reformatting of documents is performed. A problem with Suh's technology is that too many pop-ups clutter the display, and also it is not suitable for creating fixed-sized thumbnails. For more information, see Suh, "Popout Prism: Adding Perceptual Principles to Overview+Detail Document Interfaces," Proceedings of CHI'2002, Minneapolis, Minn., Apr. 20-25, 2002.

Chen et al. extracted semantic information from document images by forming summary sentences based on a statistical model. For more information, see Chen et al., "Extraction of Indicative Summary Sentences from Imaged Documents," Proceedings of ICDAR'97, Aug. 18-20, 1997, Ulm, Germany. Similarly Maderlechner et. al. extracted information from document images based on layout information. For more information, see Maderlechner et al., "Information Extraction from Document Images using Attention Based Layout Segmentation," Proceedings of DLIA'99, Sep. 18, 1999, Bangalore, India. However, neither of their work can be used to generate thumbnails since these lack the ability to reformat image components into a constrained display.

A technology referred to as SmartNail technology was developed as a response to this problem. See U.S. patent application Ser. No. 10/435,300, entitled "Resolution Sensitive Layout of Document Regions," filed May 9, 2003, assigned to the corporate assignee of the present invention, published Jul. 29, 2004 (Publication No. 20040145593). SmartNails use image based analysis, ignoring semantics such as document topics. Selected components in a document image are shrunk to a readable size depending on a visual importance measure without incorporation of any important semantic information extracted from the document.

In a document retrieval application, users usually submit queries, which are typically combinations of keywords, and wait for the documents to be displayed. From the perspective of information retrieval, users must make a quick judgment about the resulting documents on how relevant each is to users' queries. Therefore, pure image-based generation of thumbnails without incorporation of query information for documents is not enough.

SUMMARY OF THE INVENTION

A method and apparatus is disclosed herein for generating visualizations of documents based on semantic information. In one embodiment, the method comprises selecting a plurality of image segments having a plurality of attributes that includes a semantic importance information for each of the plurality of document image segments and determining a plurality of positions and a plurality of geometric operations to be performed on the plurality of document image segments according to the plurality of attributes and display constraints.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
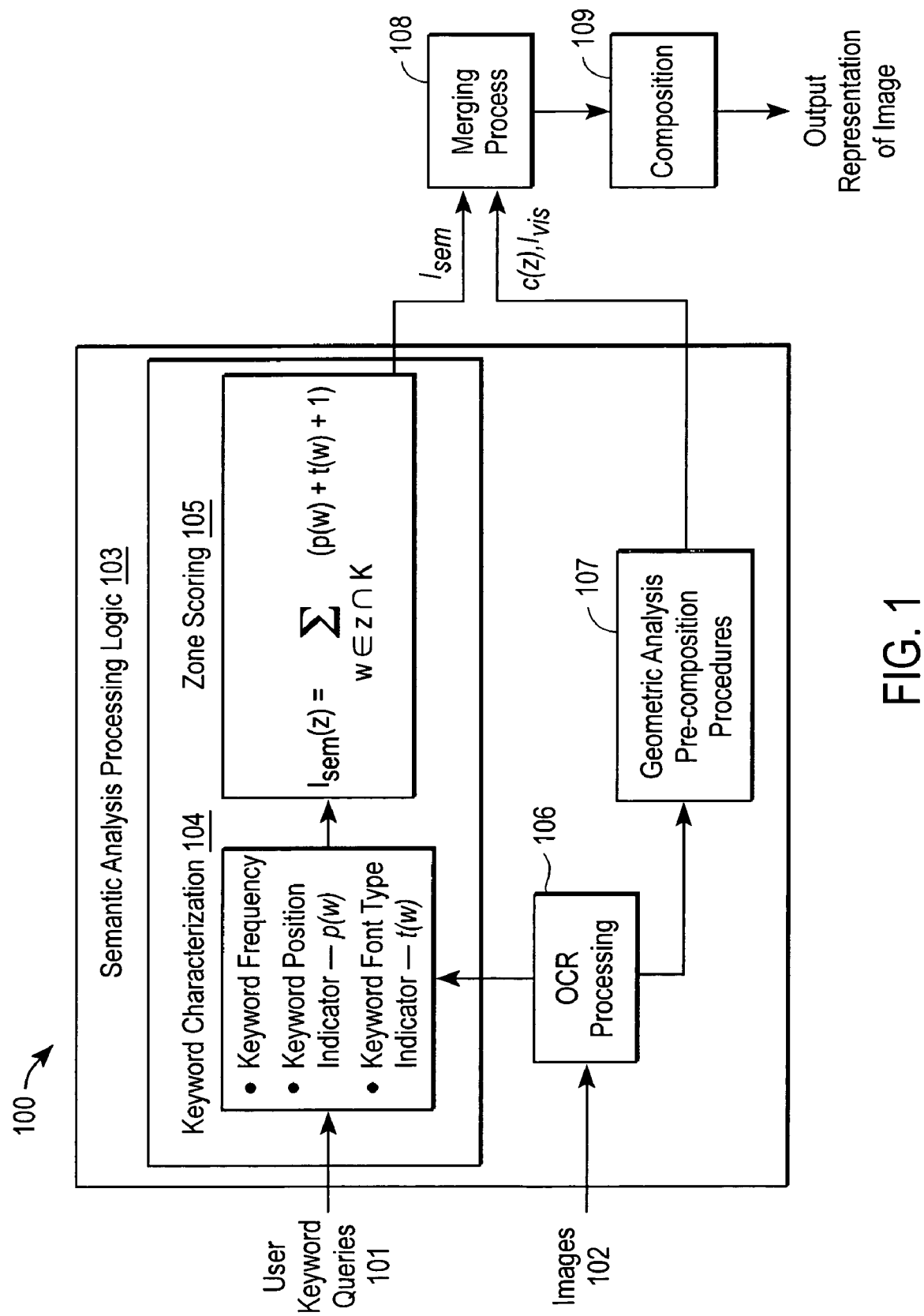
FIG. 1 illustrates one embodiment of a system for generating representations of images using keyword characterization and zone scoring.

A method and an apparatus to generate a layout for creating a pictorial document representation (e.g., a thumbnail) based on semantic information are described. In one embodiment, the techniques described herein consider the content of text in a document image in generating a pictorial representation of a document image. Therefore, techniques described herein enable generating pictorial representations of document images based on semantic analysis of the content of the document.

The semantic information may come from semantic analysis. The semantic analysis may be performed on texts zones and may be based on keyword-based attribute extraction. In one embodiment, a metric is used to combine visual and semantic importance attributes of text zones to merge attributes to facilitate composition of a pictorial representation.

The following disclosure provides a framework for the layout problem for a two-dimensional display assuming resolution-sensitive segmentation results combined with semantic document information as an input. The techniques described herein perform a document layout in order to determine the appropriate resolution and placement of document segments. Segments are placed in a constrained display allowing the operations of scaling, cropping and changing the spatial relationships between segments. In one embodiment, adjustment of the layout algorithm to visualize semantically relevant parts of text zones is performed. In one embodiment, the layout processing is modified to include keyword dependent cropping.

In one embodiment, the pictorial representations are generated in response to specific user queries. The rendering of the pictorial representation shows document content that relates to the query. Thus, for the same document, different user queries typically cause different pictorial representations to be produced.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

Embodiments of the present invention combine both semantic information extraction and image reformatting to provide images of reduced-size to represent documents. The techniques described herein use a semantic document analysis in generating the reduced-size images.

In one embodiment, this is useful to enhance browsing documents in a small display device. In one embodiment, a practical usage of the techniques described herein is that when a user types in a query, the system returns the reduced-size images containing semantically relevant document information (e.g., content where the keyword occurs). In one embodiment, the present invention takes in a user's query terms, identifies relevant portions of the document, and assigns important attributes derived via the relevancy to the query. Assignment of the importance attributes not only enables ranking of the document in order of the relevancy to the query, but also enables the layout processing to optimize a cost function penalizing scaling, cropping, and repositioning of document portions. In one embodiment, optimizing the cost function is performed according to U.S. patent application Ser. No. 10/435,300, entitled "Resolution Sensitive Layout of Document Regions, filed May 9, 2003, assigned to the corporate assignee of the present invention, published Jul. 29, 2004 (Publication No. 20040145593).

FIG. 1 illustrates one embodiment of a system for generating representations of images using semantic document information characterization (e.g., keyword characterization) and zone scoring. Each of the blocks comprises processing logic that may comprise hardware (e.g., circuitry, dedicated logic, etc.), software (such as is run on a general purpose computer system or a dedicated machine), or a combination of both.

Referring to FIG. 1, semantic analysis processing logic 103 receives user keyword queries 101 and images 102 and produces outputs that are used by merging process block 108 to generate information that controls composition block 109 to create an output representation of the images. In one embodiment, semantic analysis processing logic 103 includes OCR processing block 106 that performs optical character recognition on images 102 to produce optical character recognition results that are sent to keyword characterization block 104 and pre-composition procedures block 107.

Regarding the output of OCR processing block 106, in one embodiment, generating the pictorial representation with semantic document information begins with preprocessing segment documents into zones based on line interspaces. In one embodiment, this is done in the same manner as described in U.S. patent application Ser. No. 10/354,811, entitled "Reformatting Documents Using Document Analysis Information," filed Jan. 29, 2003, assigned to the corporate assignee of the present invention, published Jul. 29, 2004 (Publication No. 20040146199. To obtain that information, a document is processed with optical character recognition (OCR) in order to extract geometric document layout information such as document structure and text recognition results. In one embodiment, information for each character is provided and output files are created using ExperVision, www.expervision.com, 4109 Clipper Court, Fremont, Calif. in the following format:

1) line indicator and data set forth the coordinates of a line in the original scanned document image;
2) word indicator and data sets forth the coordinates of a word in a line in the original scanned document image along with an indication of whether the word is in the OCR dictionary; and
3) character indicator and data sets forth the coordinates of each character in a word in a line in the original scanned image along with indications of whether the character is bold or italic, and indications of the character font and size, the ASCII for the character, the number of characters in the bounding box, and an indication of the confidence of the character recognition.

After performing the OCR processing, an analysis on text of zones described in the output bitmap above is performed. In one embodiment, semantic analysis processing logic 103 performs a semantic analysis using keyword information. Keywords may be obtained from user queries. Keywords may be automatically extracted. The automatic extraction of keywords may be performed as described in Salton, G., Buckley, C.,"Text-Weighting Approaches in Automatic Text Retrieval," Information Processing and Management, vol. 24, pp. 513-523,1988, or as described in Matsuo, Y. Ishizuka, M., "Keyword Extraction from a Single Document using Word Co-Occurrence Statistical Information," International Journal on Artificial Intelligence Tools, vol. 13, no. 1, pp. 157-169, 2004.

Paragraph information and/or header zone may be used as well by semantic analysis processing logic 103. In one embodiment, key paragraphs are extracted automatically. This may be performed according to the description in Fukumoto, F., Suzuki, Y., Fukumoto, J., "An Automatic Extraction of Key Paragraphs Based on Context Dependency," Proceedings of Fifth Conference on Applied Natural Language Processing, pp. 91-298, 1997.

In one embodiment, the following two items are used for keyword image characterization:

keyword font information (e.g., size, type, capitalized, etc.)

keyword positions (e.g., beginning of a zone, end of the zone, etc.)

Semantic pre-merging processing logic 103 combines the above attributes of keywords into a metric for use in computing a score for each zone. In one embodiment, in generating pictorial representations, the zones with highest scores are the first zones considered for placement into the pictorial representation.

In one embodiment, keyword characterization block 104 of semantic pre-merging processing logic 103 receives user keyword queries 101 and an output from OCR processing block 106. In response to these inputs, keyword characterization block 104 characterizes keywords that appear in the document image segments based on the user keyword queries 101. In one embodiment, keyword characterization block 104 performs the keyword characterization based on one or more of keyword frequency, keyword position indication (e.g., keyword position indicator $p(w)$), and keyword font type (e.g., keyword font type indicator $t(w)$).

In one embodiment, keyword characterization block 104 extracts a number of attributes from the analysis on the output file from the OCR processing block 106. In one embodiment, these attributes are keyword position indicator $p(w)$; keyword font type indicator $t(w)$; zone capitalized indicator $c(w)$. Each keyword w in the keyword set has attributes and $p(w)$, $t(w)$ and $c(w)$ associated with it. In one embodiment, the value of $p(w)$ is decided based upon the coordinates position with respect to the enclosing zone.

$$p(w) = \begin{cases} 1 & \text{if keyword appears in the upper half of the zone} \\ 0 & \text{otherwise} \end{cases} \quad (1)$$

In one embodiment, the value of t(w) is decided upon the font type:

$$t(w) = \begin{cases} 1 & \text{if keyword in bold or italic} \\ 0 & \text{otherwise} \end{cases} \quad (2)$$

A capitalization indication attribute c(w) is computed to distinguish capitalized keywords in non-capitalized zones:

$$c(w) = \begin{cases} 1 & \text{if the word is capitalized in a non-capitalized zone} \\ 0 & \text{otherwise} \end{cases} \quad (3)$$

Alignment information may be used. The alignment information such as "centered" is stored for use when performing the reflowing procedure. In one embodiment, alignment information is computed by looking at the center position of the bounding box of the first text line as compared to the center position of the bounding box of this zone.

Some other possible attributes that can be obtained are the sizes of the bounding boxes for the words, point sizes for the words, etc. Using these to derive a visual importance measurement (e.g., a visual importance value) is well-known in the art. For example, see U.S. patent application Ser. No. 10/354,811, "Reformatting of Scanned Documents Using Layout Analysis Information," filed Jan. 29, 2003 and published on Jul. 29, 2004 (Publication No. 20040146199), assigned to the corporate assignee of the present invention and incorporated herein by reference.

In one embodiment, only the three attributes depicted in equations (1)-(3) are used to characterize semantic document information.

The output of keyword characterization block 104 is input to zone scoring block 105. Zone scoring block 105 determines the semantic importance of each zone. In one embodiment, a metric is derived that is referred to herein as the semantic importance value $I_{sem}(z)$. In one embodiment, scoring block generates a semantic importance value for each zone based on the following equation:

$$I_{sem}(z) = \sum_{w \in z \cap K} (p(w) + t(w) + 1 + c(w)) \quad (4)$$

Zone scoring block 101 outputs an importance value $I_{sem}$, where z is a text zone and K is the set of keywords.

In one embodiment, to calculate the semantic importance value for zones containing key paragraphs, not just keywords, the following formula may be used:

$$I_{sem}(z) = \sum_{p \in z \cap P} 1$$

where p is a paragraph, and P is the set of all key paragraphs.

In one embodiment, each text zone has an associated visual importance value $I_{vis}(z)$ that is computed by pre-composition numbers 107 that is based only on visual characteristics such as, for example, the position of the zone in the page and character size of text inside the zone.

Pre-composition procedures block 107 performs pre-composition procedures based on results of OCR processing 106. In one embodiment, pre-composition procedures generate visual importance information and a capitalization indication. In one embodiment, a capitalization indication attribute C(z) is computed to distinguish zones containing capital letters from other zones. Those zones are typically important because they are usually titles, captions or some other instructive description of the document. In one embodiment, the value of C(z) is decided upon the following measurement:

$$C(z) = \begin{cases} 1 & \text{if the zone is capitalized} \\ 0 & \text{otherwise} \end{cases} \quad (5)$$

In one embodiment, the output of pre-composition procedures block 107 is importance value is $I_{vis}$ and C(z).

The outputs of semantic pre-merging processing logic 103 and pre-composition procedures block 107 are input to merging process block 108. In response to these inputs, merging processing block 108 merges the importance values to create a combined importance value. The output of merging processing block 108 is input to composition block 109. Composition block 109 generates the output representation of an image based on its inputs. Optionally, composition block 109 may perform merging with image based analysis and layout information according to U.S. patent application Ser. No. 10/354,811, entitled "Reformatting Documents Using Document Analysis Information," filed Jan. 29, 2003, assigned to the corporate assignee of the present invention, published Jul. 29, 2004 (Publication No. 20040146199) and performs image creation.

Figure 2:
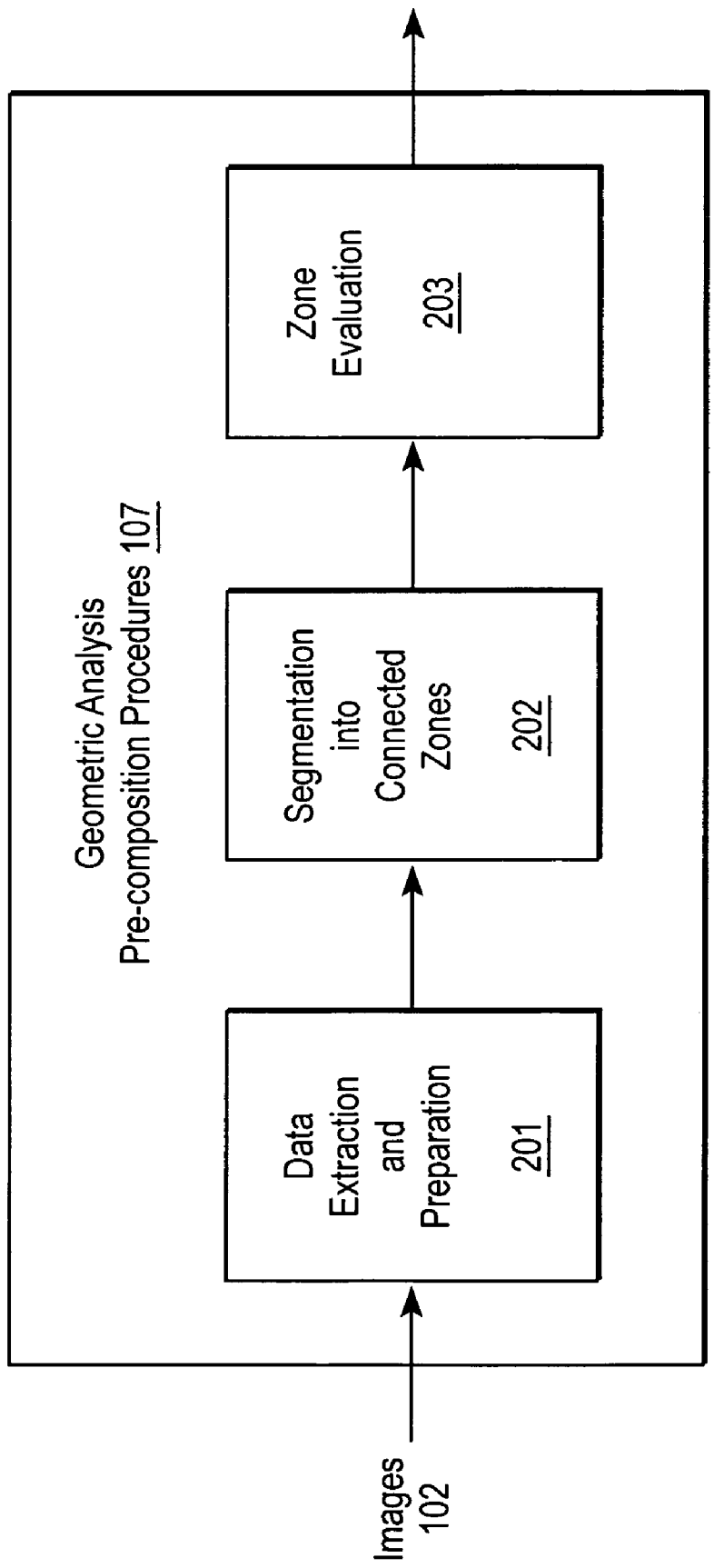
FIG. 2 illustrates one embodiment of the geometric analysis pre-composition procedures block 107.

FIG. 2 illustrates one embodiment of the pre-composition procedures block 107. Each of the blocks in FIG. 2 is performed by processing logic that may comprise hardware (e.g., circuitry, dedicated logic, etc.), software (such as is run on a general purpose computer system or a dedicated machine), or a combination of both.

Referring to FIG. 2, pre-composition procedures block 107 includes a data extraction and preparation block 201 that receives images 102 and extracts attributes relating to portions (e.g., text) of the image.

In response to the output of data extraction and preparation block 201, segmentation unit 202 segments the image data into zones, which are output to zone evaluation unit 203. Zone evaluation unit 203 evaluates each of the zones generated by segmentation unit 202. In one embodiment, zone evaluation unit 203 outputs a visual importance information value (e.g., a visual importance value $I_{vis}$) and capitalization indication value c(z), which represent the outputs of pre-composition procedures 107. In one embodiment, the operation described in conjunction with FIG. 2 are performed according to the techniques described in U.S. patent application Ser. No. 10/354,811, entitled "Reformatting Documents Using Document Analysis Information," filed Jan. 29, 2003, published Jul. 29, 2004 (Publication No. 20040146199).

After generating the importance value for each text zone and the semantic importance value, the importance value I(z) for the zone is generated using a combination of $I_{vis}(z)$ and $I_{sem}(z)$. In one embodiment, a straightforward linear combination of both $I_{vis}$ and $I_{sem}$ is computed as follows:

$$I(z) = \left[ \alpha \times \frac{I_{vis}(z)}{\max_{Z \in D} \{I_{vis}(A)\}} + (1-\alpha) \times \frac{I_{sem}(z)}{\max_{Z \in D} \{I_{sem}(Z)\}} \right] \cdot \max_{z \in D} \{I_{vis}(z)\} \quad (5)$$

where $\alpha$ is scalar between 0 and 1.

In one embodiment, $\alpha$ is set by the application or by the user. In another embodiment $\alpha$ is derived from the data, e.g., $$\alpha = \frac{\sigma(I_{vis})}{\max_{z \in D}\{I_{vis}(z)\}} \text{ with}$$

$$\sigma(I_{vis}) = \sqrt{1/(|D|-1) \cdot \sum (I_{vis}(z) - \overline{I_{vis}})^2},$$

where $|D|$ is the number of zones in $$D \text{ and. } \overline{I_{vis}} = \frac{1}{|D|} \cdot \sum_{z \in D} I_{vis}(z)$$

In this case, if all zones have similar visual importance value $I_{vis}$, then the standard deviation $\sigma(I_{vis})$ is close to zone, i.e., $\alpha \approx 0$, and the appearance of keywords captured by semantic importance value $I_{sem}$ is the dominating part in the combined importance measure. In contrast, if there is a lot of variation in the appearance of the zones, i.e. the standard deviation of the set of $I_{vis}$ values is high, then $\alpha \approx 1$, and the importance of the semantic importance values $I_{sem}$ is low.

In another embodiment, $\alpha$ is chosen such that it incorporates other semantic document information, such as logical layout analysis information. $\alpha$ may depend on whether a zone is a title in a document or a regular paragraph. In case of a title zone, $\alpha$ may be set to 1, i.e. the importance of the title zone is independent from keyword occurrence. For a regular paragraph, $\alpha$ may be set to 0, such that semantic importance dominates over visual importance.

Figure 3:
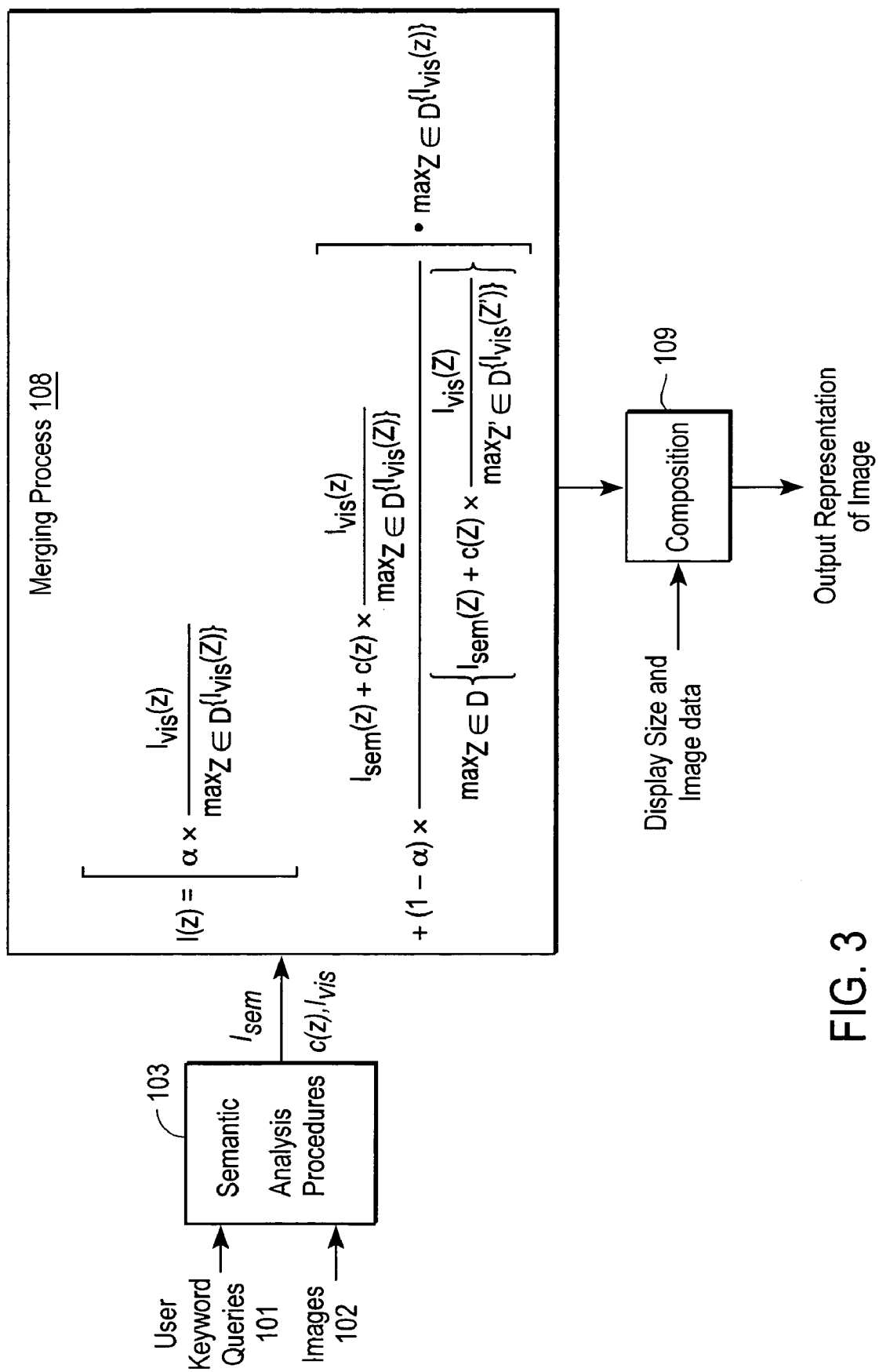
FIG. 3 illustrates one embodiment of processing logic for reformatting documents using semantic and geometric document analysis information.

FIG. 3 illustrates one embodiment of processing logic for reformatting documents using document analysis information. Referring to FIG. 3, merging process block 108 is shown merging visual and semantic importance values output from semantic pre-merging processing logic 103. In one embodiment, merging process block 108 merges the visual important value $I_{vis}(z)$ and the semantic importance value $I_{sem}(z)$ and the capitalization information $C(z)$ according to the following:

$$I(z) = \left[ \alpha \times \frac{I_{vis}(z)}{\max_{Z \in D}\{I_{vis}(z)\}} + (1-\alpha) \times \frac{I_{sem}(z) + C(z) \times \frac{I_{vis}(z)}{\max_{Z \in D}\{I_{vis}(z)\}}}{\max_{Z \in D}\left\{I_{sem}(z) + C(z) \times \frac{I_{vis}(z)}{\max_{Z' \in D}(Z')}\right\}} \right] \cdot \max_{z \in D}\{I_{vis}(z)\}$$

The output of merging process block 108 is input to composition block 109, which generates the output representation of the image.

Alternatively, other methods of combining $I_{vis}$ and $I_{sem}$ can be used. In one embodiment, $I_{vis}(z)$ and $I_{sem}(z)$ are multiplied. One disadvantage to this approach is that information of the other is lost if one of the values is 0.

As discussed above, in one embodiment, all the importance values $\{I(z)|Z \in D\}$ are calculated and zones with highest importance values are considered to be placed in the pictorial representation by a layout procedure. The pictorial representation may now contain some semantic document information based on keyword queries (if $\alpha$<1).

Zone Layout Operations

In one embodiment, the output of merging process block 108 is an output file containing keyword information. The output of merging process block 108 may be streaming output. In one embodiment, this output file is an input to merging processing logic (e.g., a merge program) to be merged with segment descriptions resulting from the image analysis as described in U.S. patent application publication Ser. No. 10/354,811, entitled ""Reformatting Documents Using Document Analysis Information," filed Jan. 29, 2004, assigned to the corporate assignee of the present invention, and published Jul. 29, 2004 (Publication No. 20040146199). The output file is an input to a layout program composition block 109 (e.g., to generate a semantic pictorial representation). In one embodiment, the first row of the output file is defined as:

width, height, number of entries, number of zones, maximal number of fragments where the "width" and "height" are the dimension of the original scanned document image. The number of zones contains the number of both text and image zones. Fragments are usually words in text zones. In one embodiment, each entry observes the following specification:

column 1: index of zones
column 2: index of individual words in the zone
column 3: downsampled scaler
column 4: leftX
column 5: upperY
column 6: x dimension
column 7: y dimension
column 8: importance value I multiplied by 100
column 9: mark (1-text, 0-image)
column 10: alignment flag
column 11: number of fragments in the zone
column 12: keyword pointer In the output file above, "keyword pointer" is characterized by the index of the first word in the line, where the keywords first occur in the original scanned document image. If it is not a keyword, then this attribute is set to 0.

During the reflowing process, candidate zones are chosen to fill in the pictorial representation in order of their importance values I. Depending on the available space, cropping of words may be necessary. However, the keywords might be cropped out because of the limit on available white space if the keywords do not occur at the beginning of the zone. This may lead to a loss of semantic information. In one embodiment, to overcome this disadvantage, zones are filled starting from the line where keywords first occur within the zones. In an alternative embodiment, cropping is performed by filling from the beginning of the sentence in which the keywords first occur.

Figure 7:
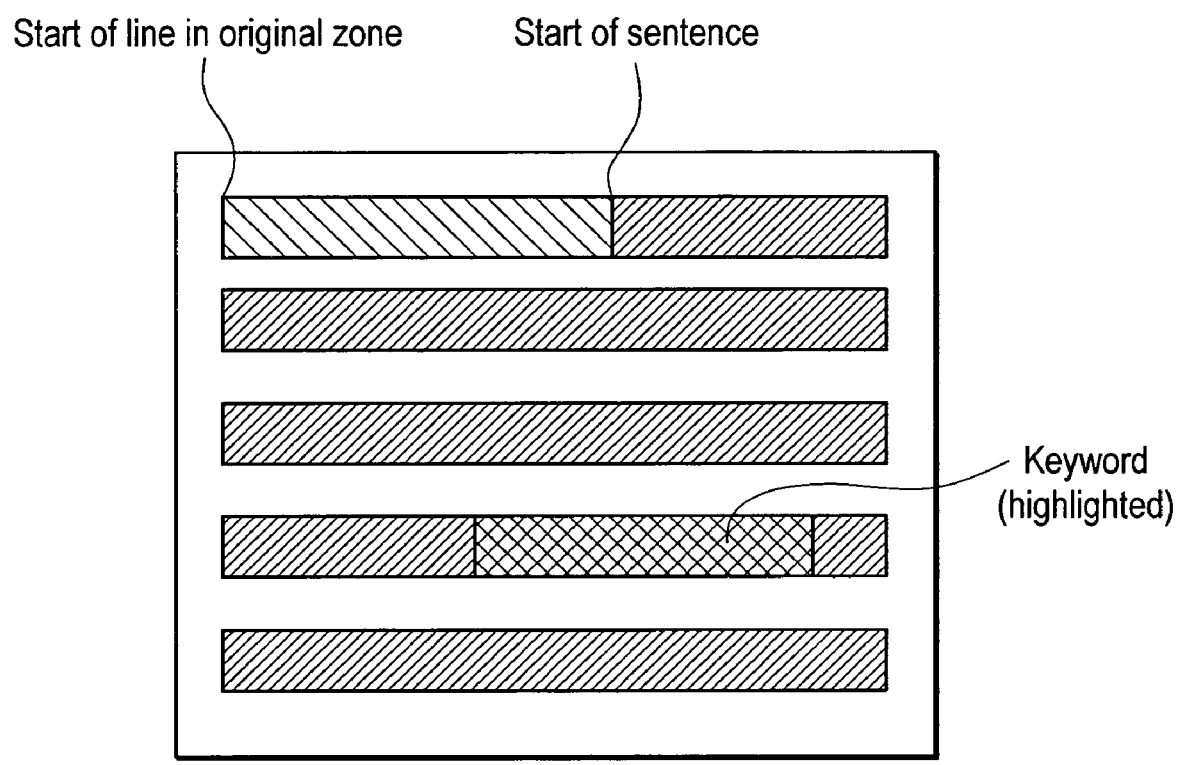
FIG. 7 is an example of a keyword-dependent layout.

Some other possible layout approaches can be taken to beautify the layout such as using grey out texts to symbolize the irrelevant texts, or to highlight keywords. This may save more space for relevant texts. FIG. 7 is an example of a keyword-dependent layout. Referring to FIG. 7, start of a line in the original zone is shown with the start of a sentence and keyword, all of which are different colors.

Exemplary Processing

Figure 4A:
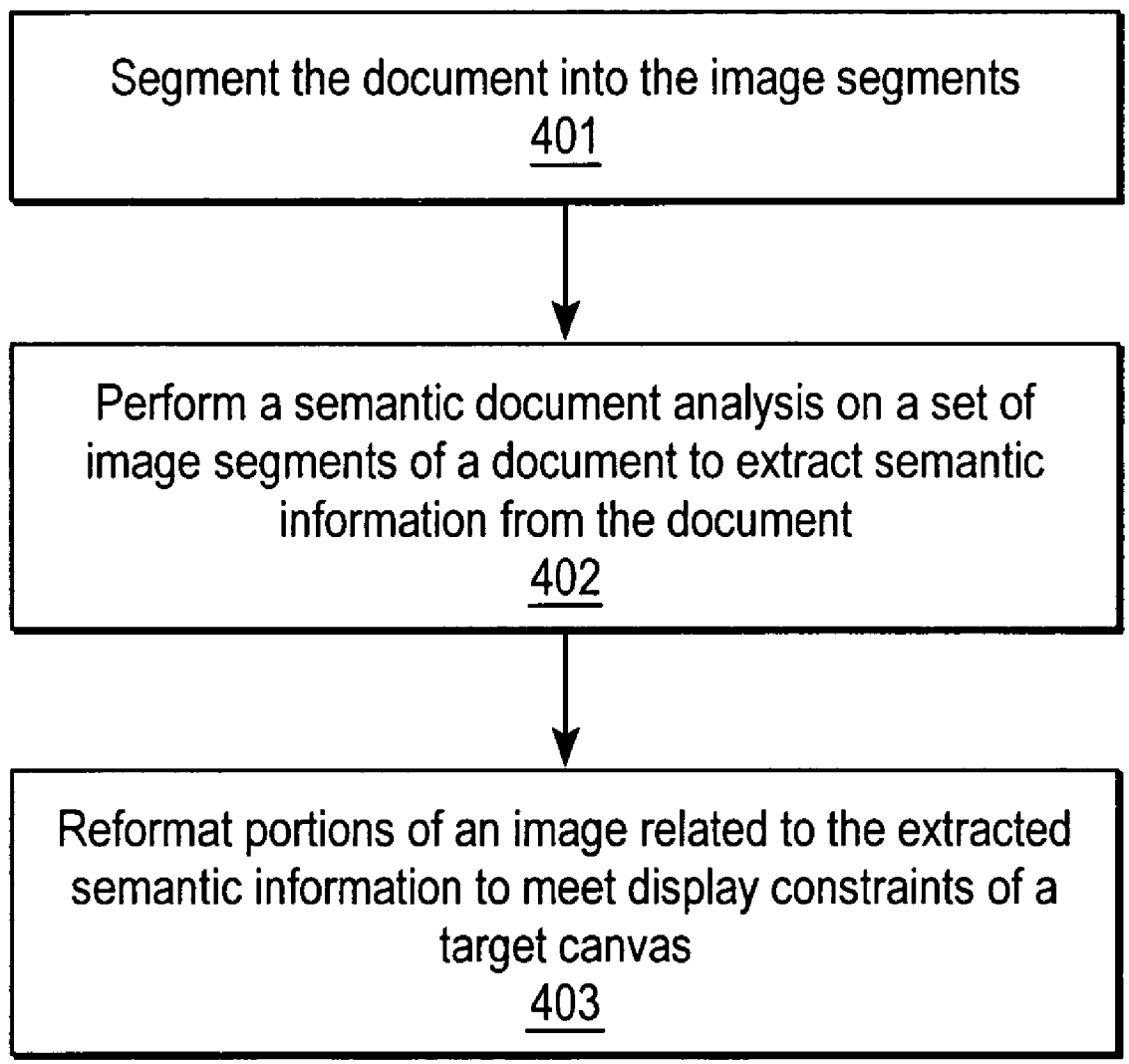
FIGS. 4A-C are flow diagrams of one embodiment of a process for generating pictorial representations of selected image segments of a document.

FIG. 4A is a flow diagram of one embodiment of the process of reformatting image segments. The process is performed by processing logic that may comprise hardware (e.g., circuitry, dedicated logic, etc.), software (such as is run on a general purpose computer system or a dedicated machine), or a combination of both.

Referring to FIG. 4A, the process begins by processing logic segmenting the document into document image segments (processing block 401). In one embodiment, the segmentation is based on results of OCR layout analysis (e.g., lines interspaces) such as is described in U.S. patent application Ser. No. 10/354,811, entitled "Reformatting Documents Using Document Analysis Information," filed Jan. 29, 2003, assigned to the corporate assignee of the present invention, published Jul. 29, 2004 (Publication No. 20040146199, particularly paragraphs 54, 55 and 75-78.

Using the document image segments, processing logic performs a semantic document analysis on a set of document image segments of a document to extract semantic information from the document (processing block 402). In one embodiment, given a list of keywords, processing logic performs semantic document analysis by extracting keyword attributes from each of the document image segments. In one embodiment, processing logic extracts keyword attributes from each document image segment by performing keyword characterization on each of the image segments.

Figure 4B:
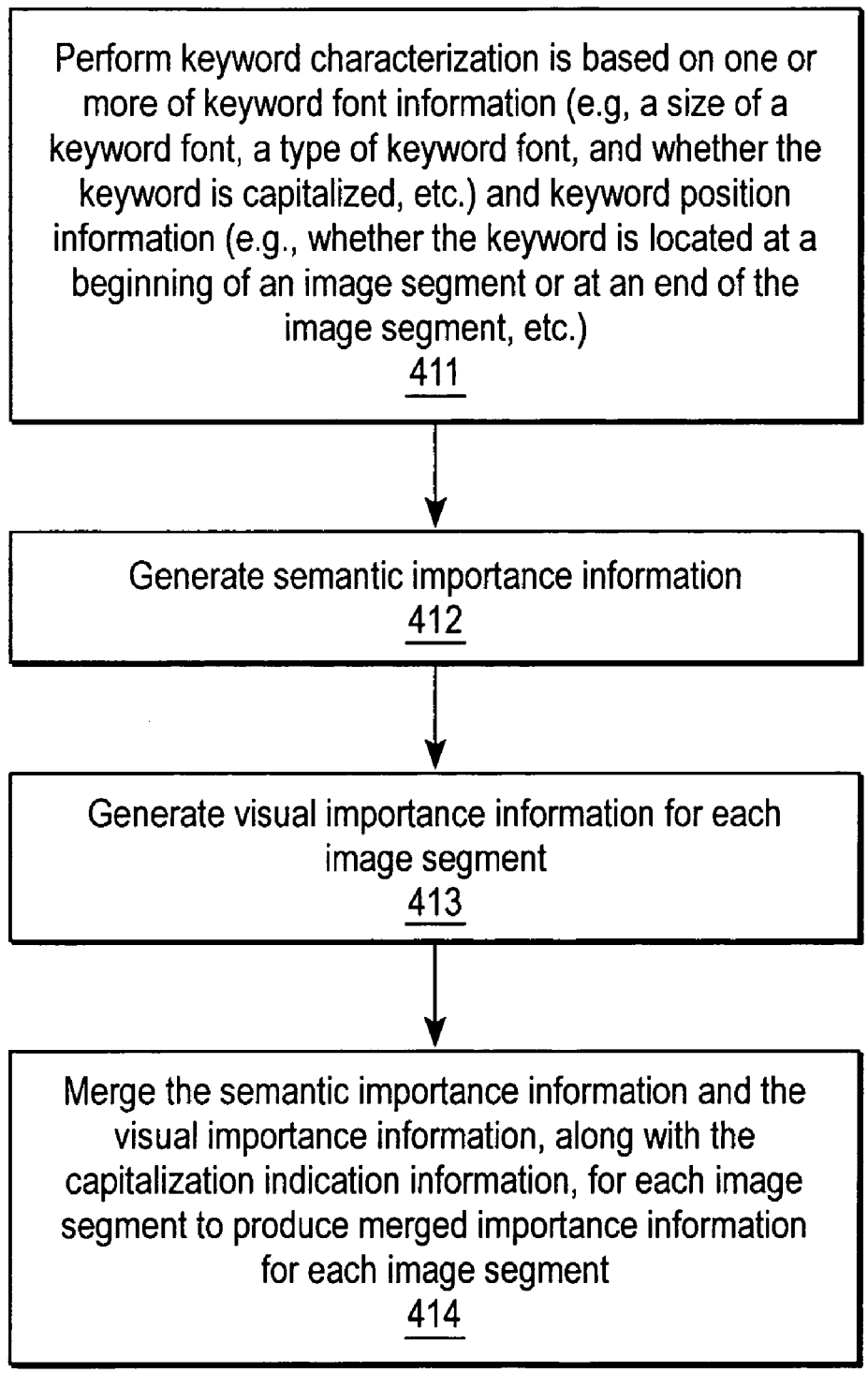

FIG. 4B is a flow diagram of one embodiment of a process for performing semantic document analysis on a set of document image segments of a document to extract semantic information from the document. The process is performed by processing logic that may comprise hardware (e.g., circuitry, dedicated logic, etc.), software (such as is run on a general purpose computer system or a dedicated machine), or a combination of both.

Referring to FIG. 4B, the process starts by processing logic performing keyword characterization based on one or more of keyword font information (e.g., a size of a font of the keyword, a type of font of the keyword, and whether the keyword is capitalized, etc) and keyword position information (e.g., whether the keyword is located at a beginning of an image segment or at an end of an image segment, etc.) (processing block 411). In one embodiment, the keyword attributes comprise a keyword position indicator, a keyword font type indictor and an image segment capitalization indicator and may include the size of a bounding box for a word and the point size of a word. In one embodiment, processing logic generates a capitalization indicator for each image segment.

After keyword attribute extraction, processing logic generates semantic importance information (processing block 412). In one embodiment, processing logic generates information for document each image segment indicative of semantic importance in the document. In one embodiment, the semantic importance is based on a keyword query. In one embodiment, the information indicative of semantic importance is a semantic importance value.

Processing logic also generates visual importance information for each document image segment (processing block 413). In one embodiment, the semantic importance information comprises semantic importance values and the visual importance information comprises visual importance values.

After generating the semantic importance information and the visual importance information, processing logic merges the semantic importance information and the visual importance information, along with the capitalization indication information, for each document image segment to produce merged importance information for each image segment (processing block 414).

Referring back to FIG. 4A, based on the extracted semantic information, processing logic reformats portions of an image related to the extracted semantic information to meet display constraints of a target canvas (processing block 403).

Figure 4C:
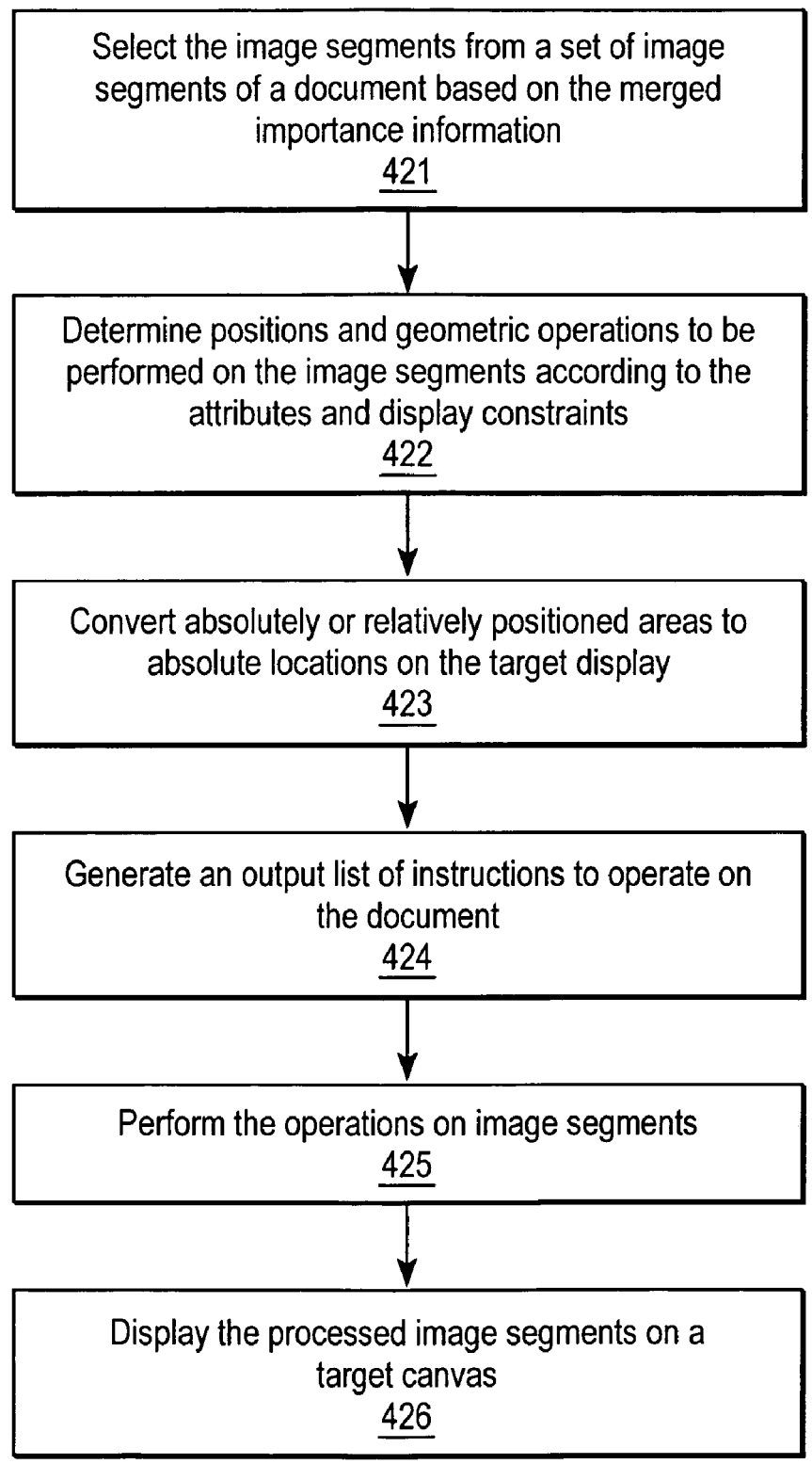

FIG. 4C is a flow diagram of one embodiment of a process for reformatting portions of an image based on extracted semantic information. The process is performed by processing logic that may comprise hardware (e.g., circuitry, dedicated logic, etc.), software (such as is run on a general purpose computer system or a dedicated machine), or a combination of both.

Referring to FIG. 4C, processing begins by processing logic selecting the document image segments from a set of document image segments of a document based on the merged importance information (processing block 421). In one embodiment, because the merged importance information is based on the semantic importance value, the selection is based on the semantic importance value. In another embodiment, merged importance information is based on semantic and visual text information and visual image information.

Next, processing logic determines positions and geometric operations to be performed on the document image segments according to the attributes and display constraints (processing block 422).

Using the position and geometric operation information, processing logic converts absolutely or relatively positioned areas to absolute locations on the target display (processing block 423) and generates an output list of instructions to operate on the document (processing block 424).

Lastly, processing logic performs the operations on image segments (processing block 425), such as cropping, scaling and pasting, and displays the processed image segments on a target canvas (processing block 426).

An Exemplary System

Figure 5:
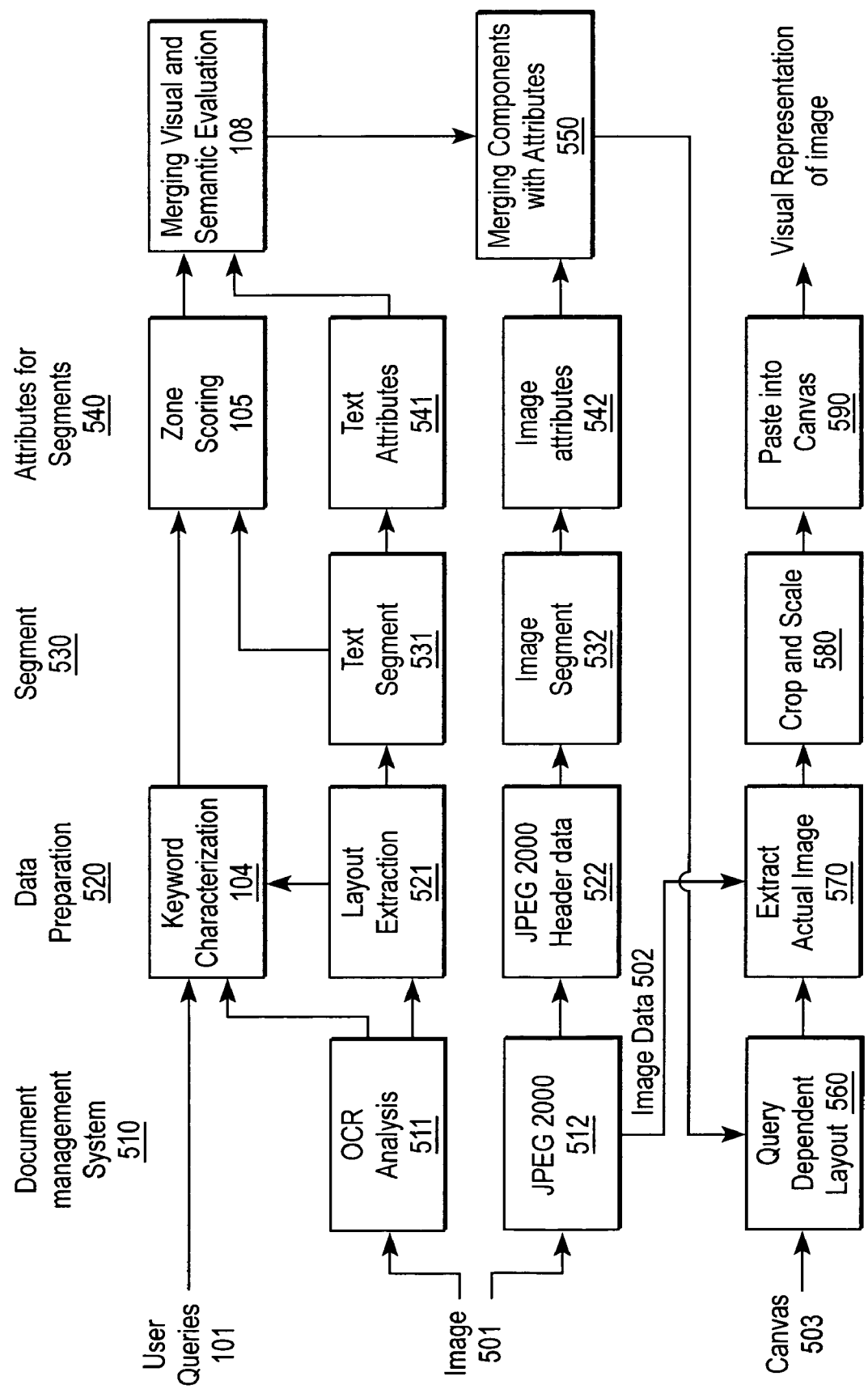
FIG. 5 shows an exemplary embodiment of an image analysis and layout system.

FIG. 5 shows an exemplary embodiment of an image analysis and layout system. The components in the system are implemented with processing logic that may comprise hardware (e.g., circuitry, dedicated logic, etc.), software (such as is run on a general purpose computer system or a dedicated machine), or a combination of both.

Referring to FIG. 5, the system performs layout analysis and optical character recognition 511 on an image 501. The image 501 is also provided to JPEG 2000 encoding 512. In one embodiment, JPEG 2000 encoding performs JPEG 2000 encoding in two layers.

Processing logic then performs data preparation on the outputs from the layout analysis and optical character recognition 511, as well as the result from the JPEG 2000 decoding 512 (processing block 520). Data preparation includes keyword characterization (104), extraction of optical character recognition layout analysis information (processing block 521) and extraction of JPEG 2000 packet header data (processing block 522). Examples of how this is done may be found in U.S. Patent Applications for "Reformatting Documents Using Document Analysis Information", "Content and Display Device Dependent creation of Smaller Representations of Images" and "Header-Based Processing of Images Compressed Using Multi-Scale Transforms," (U.S. patent application Ser. Nos. 10/354,811, 10/044,603 and 10/044,420), which are publicly available and incorporated herein by reference, and assigned to the assignee of the present invention. Processing logic extracts optical character recognition layout analysis information from the results of the optical character recognition layout analysis, and extracts JPEG 2000 packet header data from the results of the JPEG 2000 encoding.

Processing logic then performs segmentation of the result from data preparation into connected components (processing block 530). Text zone segmentation is performed on the data from the extraction of optical character recognition layout analysis information (processing block 531), and segmentation is performed on JPEG 2000 header data from extraction (processing block 532). Then processing logic assigns attributes to each component from the segmentation processes (processing block 540). Minimal scaling, importance of text zones and fragments are assigned to components from the text zone segmentation (processing block 541). Optimal resolution and the number of bits at optimal resolution are assigned to components from the segmentation on JPEG 2000 header data (processing block 542).

Processing logic then merges the visual and semantic information (processing block 543). Thereafter, the components with attributes are then merged to generate an input list (processing block 550).

A query dependent layout operation is performed on the input list and the result of which is provided to resolution and area decoding (processing block 560). The JPEG 2000 encoding in two layers also generates image data 502 at processing block 512. Processing logic performs resolution and area decoding on the image data 502 and the output from the resolution sensitive layout 560 at processing block 570. Using the results from the resolution and area decoding 570 and information on the size of canvas 503, processing logic performs a final crop and scale operations on segments of the image (processing block 580).

Processing logic then pastes the cropped and scaled segments onto the canvas to generate a representation of the image that is dependent on the image content and the display device (processing block 590).

In one embodiment, a keyword dependent layout is generated without relying on a query. The keywords may be obtained using automatic keyword extraction. An example layout is shown in FIG. 7.

An Exemplary Computer System

Figure 6:
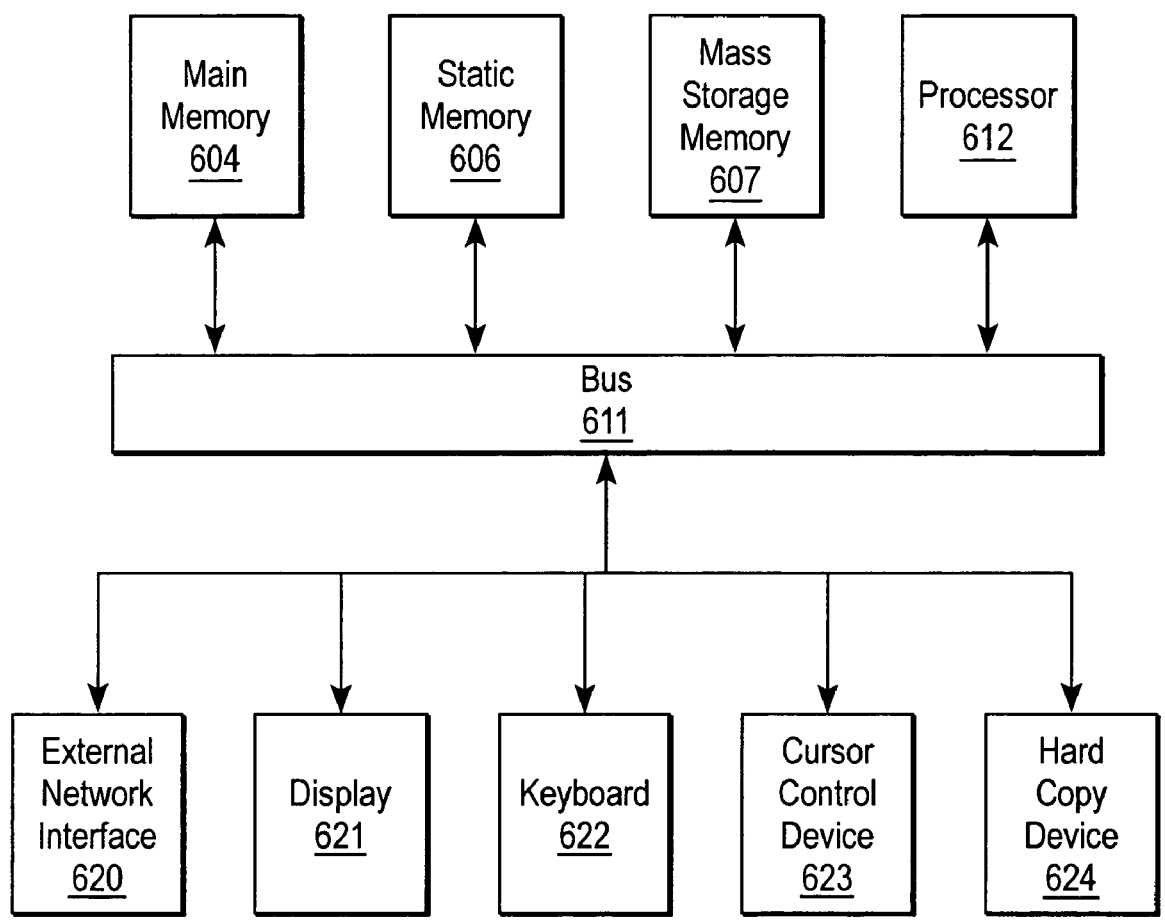
FIG. 6 is a block diagram of an exemplary computer system that may perform one or more of the operations described herein.

FIG. 6 is a block diagram of an exemplary computer system that may perform one or more of the operations described herein. Referring to FIG. 6, computer system 600 may comprise an exemplary client or server computer system. Computer system 600 comprises a communication mechanism or bus 611 for communicating information, and a processor 612 coupled with bus 611 for processing information. Processor 612 includes a microprocessor, but is not limited to a microprocessor, such as, for example, Pentium™, PowerPC™, Alpha™, etc.

System 600 further comprises a random access memory (RAM), or other dynamic storage device 604 (referred to as main memory) coupled to bus 611 for storing information and instructions to be executed by processor 612. Main memory 604 also may be used for storing temporary variables or other intermediate information during execution of instructions by processor 612.

Computer system 600 also comprises a read only memory (ROM) and/or other static storage device 606 coupled to bus 611 for storing static information and instructions for processor 612, and a data storage device 607, such as a magnetic disk or optical disk and its corresponding disk drive. Data storage device 607 is coupled to bus 611 for storing information and instructions.

Computer system 600 may further be coupled to a display device 621, such as a cathode ray tube (CRT) or liquid crystal display (LCD), coupled to bus 611 for displaying information to a computer user. An alphanumeric input device 622, including alphanumeric and other keys, may also be coupled to bus 611 for communicating information and command selections to processor 612. An additional user input device is cursor control 623, such as a mouse, trackball, trackpad, stylus, or cursor direction keys, coupled to bus 611 for communicating direction information and command selections to processor 612, and for controlling cursor movement on display 621.

Another device that may be coupled to bus 611 is hard copy device 624, which may be used for printing instructions, data, or other information on a medium such as paper, film, or similar types of media. Furthermore, a sound recording and playback device, such as a speaker and/or microphone may optionally be coupled to bus 611 for audio interfacing with computer system 600. Another device that may be coupled to bus 611 is a wired/wireless communication capability 625 to communication to a phone or handheld palm device.

Note that any or all of the components of system 600 and associated hardware may be used in the present invention. However, it can be appreciated that other configurations of the computer system may include some or all of the devices.

Applications

Semantic document pictorial representations can be used in many document retrieval systems. In such a case, users get resulting thumbnails (or other pictorial representations) directly related to their search queries. Another possible use is to add them to a document management system (e.g., Ridoc document system) in order to support document management tasks.

Alternative Embodiments

When dealing with multi-page documents, using semantic technology described herein to generate thumbnails for each single page is not appropriate. It is important to show the relationships between pages within this document. In this case, techniques described herein can be extended to achieve this goal.

In one embodiment, given a document D with n pages P1, P2, . . . , Pn. Let Z={z1*, z2*, . . . , *} be a set of zones satisfying the following condition:

$$(z_1^*, z_2^*, \ldots, z_n^*) = \mathrm{argmax}_{i,j} \in \{1, \ldots n\}, \quad (6)$$

$$z_j \in P_j z_i \in P_i \left( \prod_{i=1}^{n} I(z_1) x \prod_{i,j=1, i \neq j}^{n} sim(z_i, z_j) \right)$$

where I(z) is the information measure defined in equation above and $sim(z_i, z_j)$ is the similarity measurement between zones $z_i$ and $z_j$. There are many different algorithms to compute the similarity between two zones, e.g. N-gram method "Gauging Similarity with N-Grams: Language-Independent Categorization of Text," *Science*, Vol. 267, pp. 843-848, Feb. 10, 1995.

In one embodiment, given a set of pages within one document, the process proceeds as follows:

a) loop: find a set of zones Z satisfying condition in equation (6) above;
b) remove the zones in Z from the pages in P; and
c) continue loop until no more zones in any page exists.

Therefore, each zone in a particular page is assigned a score in an order of being chosen according to the condition in equation (6). Zones chosen first have higher scores than those chosen later. The scores are taken into consideration to replace the current I(z) values when the pictorial representation is generated for each individual page.

Figure 8:
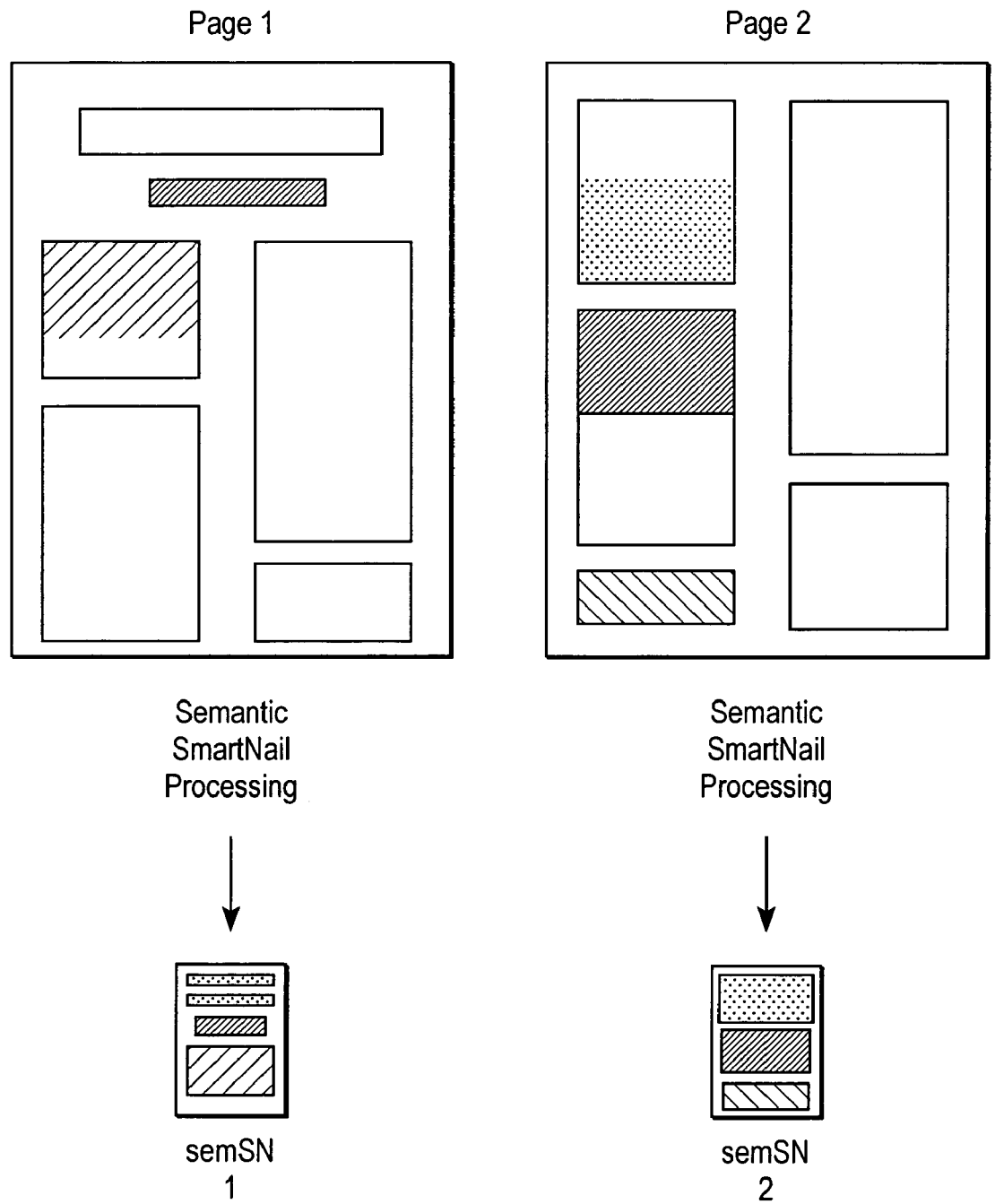
FIG. 8 illustrates two examples of representations composed individual pages created independently for each page.
Figure 9:
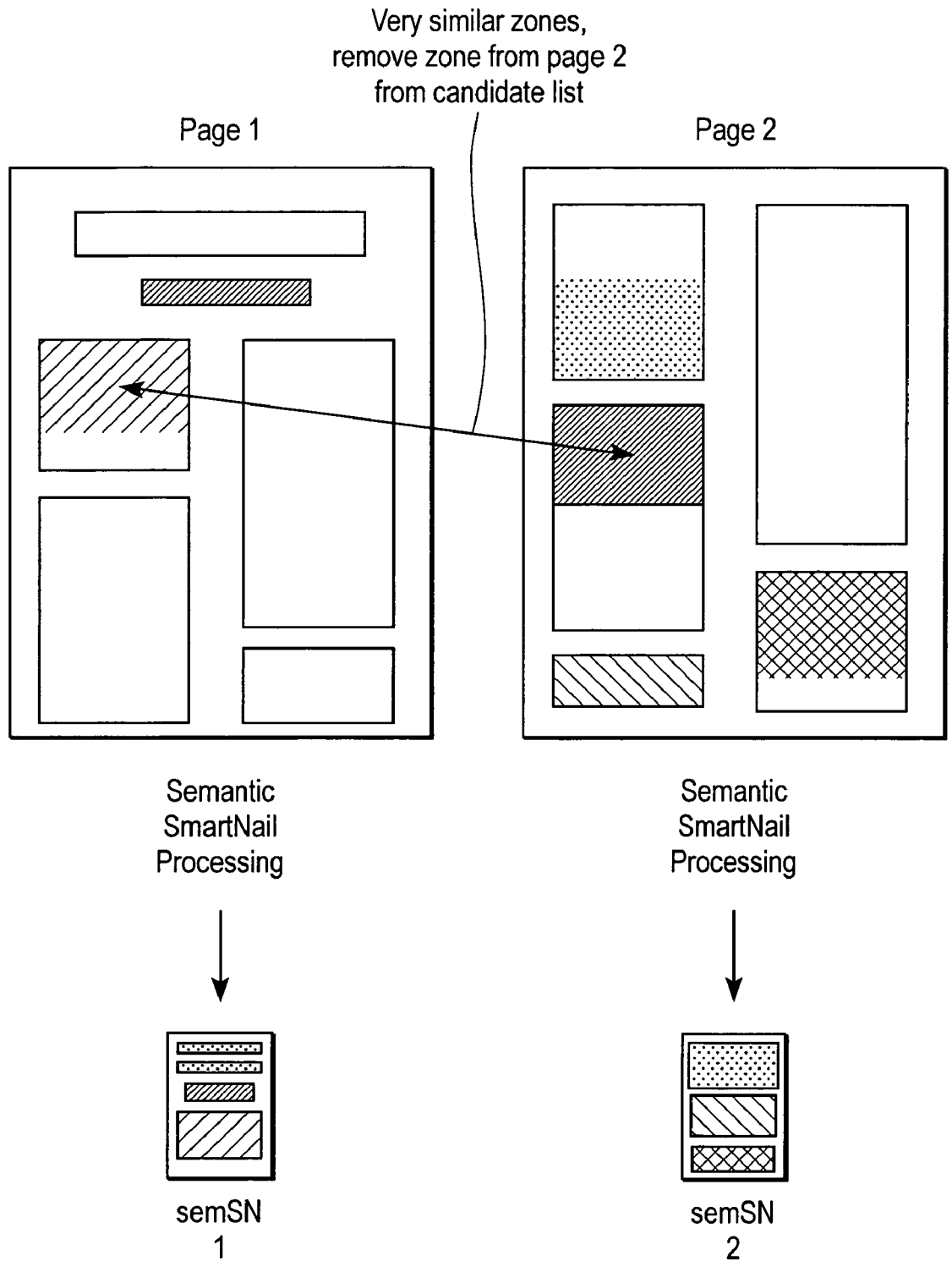
FIG. 9 illustrates two examples of representations for individual pages that depend on enter-page zone similarity.

FIG. 8 illustrates two examples of representations composed from individual pages created independently for each page. FIG. 9 illustrates two examples of representations for individual pages that depend on inter-page zone similarity.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   selecting a plurality of document image segments from a set of document image segments based on a plurality of attributes that includes a semantic importance information and a visual importance information for each of the plurality of document image segments; and
   determining a plurality of positions and a plurality of geometric operations to be performed on the plurality of document image segments according to the plurality of attributes that include the semantic importance information and visual importance information, and display constraints.

2. The method defined in claim 1 further comprising performing a semantic document analysis on a set of document image segments of a document, wherein the plurality of image segments is selected from the set of document image segments based on the semantic importance information.

3. The method defined in claim 2 wherein performing semantic document analysis comprises extracting keyword attributes from each of the document image segments.

4. The method defined in claim 3 wherein extracting keyword attributes from each of the image segments comprises performing semantic document information characterization on each of the document image segments.

5. The method defined in claim 4 wherein the semantic document information characterization is based on keyword font information.

6. The method defined in claim 5 wherein the keyword font information comprises one or more selected from a group consisting of a size of a keyword font, a type of keyword font, and whether the keyword is capitalized.

7. The method defined in claim 4 wherein the semantic document information characterization is based on keyword position information.

8. The method defined in claim 7 wherein the keyword position information comprises one or more selected from a group consisting of whether the keyword is located at a beginning of an image segment or at an end of the document image segment.

9. The method defined in claim 4 wherein the semantic document information characterization is based on keyword position information and keyword font information.

10. The method defined in claim 3 wherein the keyword attributes comprise a keyword position indicator, a keyword font type indictor and a document image segment capitalization indicator.

11. The method defined in claim 3 wherein the keyword attributes comprise one or more of the size of a bounding box for a word and the point size of a word.

12. The method defined in claim 3 further comprising generating information for each document image segment indicative of semantic importance in the document.

13. The method defined in claim 12 wherein the semantic importance is based on a keyword query.

14. The method defined in claim 12 wherein the semantic importance is based on an automatic keyword extraction.

15. The method defined in claim 12 wherein the semantic importance is based on an automatic categorization.

16. The method defined in claim 12 wherein the semantic importance is based on key paragraphs.

17. The method defined in claim 12 wherein the information indicative of semantic importance comprises a semantic importance value.

18. The method defined in claim 17 further comprising selecting the document image segments based on the semantic importance value.

19. The method defined in claim 1 further comprising:
   generating the semantic importance information;
   generating visual importance information for each document image segment;
   merging the semantic importance information and the visual importance information for each document image segment to produce merged importance information for each document image segment;
   selecting the plurality of document image segments from a set of document image segments of a document based on the merged importance information.

20. The method defined in claim 19 wherein the semantic importance information comprises semantic importance values and the visual importance information comprises visual importance values.

21. The method defined in claim 19 further comprising generating a capitalization indicator for each image segment, and wherein merging semantic importance information and visual importance information for each image segment comprises merging the semantic importance information, visual importance information and the capitalization indicator to produce merged importance information for each document image segment.

22. The method defined in claim 21 wherein the semantic importance information comprises semantic importance values and the visual importance information comprises visual importance values.

23. The method defined in claim 1 further comprising reformatting the plurality of document image segments to display the document image segments on a target canvas.

24. The method defined in claim 1 further comprising reformatting the plurality of document image segments to display the document image segments on a target canvas to create a keyword dependent layout.

25. The method defined in claim 1 further comprising segmenting the document into the document image segments based on line interspaces and font characteristics.

26. An article of manufacture having one or more computer-readable medium having instructions stored therein which, when executed by a system, cause the system to perform a method comprising:

selecting a plurality of document image segments from a set of document image segments based on a plurality of attributes that includes a semantic importance information and a visual importance information for each of the plurality of document image segments;

determining a plurality of positions and a plurality of geometric operations to be performed on the plurality of document image segments according to the plurality of attributes that include the semantic importance information and visual importance information, and display constraints.

27. The article of manufacture defined in claim 26 wherein the method further comprises performing a semantic document analysis on a set of document image segments of a document, wherein the plurality of document image segments is selected from the set of document image segments based on the semantic importance information.

28. The article of manufacture defined in claim 27 wherein performing semantic document analysis comprises extracting keyword attributes from each of the document image segments.

29. The article of manufacture defined in claim 28 wherein extracting keyword attributes from each of the document image segments comprises performing semantic document information characterization on each of the document image segments.

30. The article of manufacture defined in claim 29 wherein the semantic document information characterization is based on keyword font information.

31. The article of manufacture defined in claim 30 wherein the keyword font information comprises one or more selected from a group consisting of a size of a keyword font, a type of keyword font, and whether the keyword is capitalized.

32. The article of manufacture defined in claim 29 wherein the semantic document information characterization is based on keyword position information.

33. The article of manufacture defined in claim 32 wherein the keyword position information comprises one or more selected from a group consisting of whether the keyword is located at a beginning of a document image segment or at an end of the document image segment.

34. The article of manufacture defined in claim 29 wherein the semantic document information characterization is based on keyword position information and keyword font information.

35. The article of manufacture defined in claim 28 wherein the keyword attributes comprise a keyword position indicator, a keyword font type indictor and an image segment capitalization indicator.

36. The article of manufacture defined in claim 28 wherein the keyword attributes comprise one or more of the size of a bounding box for a word and the point size of a word.

37. The article of manufacture defined in claim 28 wherein the method further comprises generating information for each document image segment indicative of semantic importance in the document.

38. The article of manufacture defined in claim 37 wherein the semantic importance is based on a keyword query.

39. The article of manufacture defined in claim 37 wherein the semantic importance is based on automatic keyword extraction.

40. The article of manufacture defined in claim 37 wherein the semantic importance is based on automatic categorization.

41. The article of manufacture defined in claim 37 wherein the semantic importance is based on key paragraphs.

42. The article of manufacture defined in claim 37 wherein the information indicative of semantic importance comprises a semantic importance value.

43. The article of manufacture defined in claim 42 wherein the method further comprises selecting the document image segments based on the semantic importance value.

44. The article of manufacture defined in claim 26 wherein the method further comprises:

generating the semantic importance information;

generating visual importance information for each document image segment;

merging semantic importance information and visual importance information for each document image segment to produce merged importance information for each document image segment;

selecting the plurality of image segments from a set of document image segments of a document based on the merged importance information.

45. The article of manufacture defined in claim 44 wherein the semantic importance information comprises semantic importance values and the visual importance information comprises visual importance values.

46. The article of manufacture defined in claim 44 wherein the method further comprises generating a capitalization indicator for each document image segment, and wherein merging semantic importance information and visual importance information for each document image segment comprises merging the semantic importance information, visual importance information and the capitalization indicator to produce merged importance information for each document image segment.

47. The article of manufacture defined in claim 46 wherein the semantic importance information comprises semantic importance values and the visual importance information comprises visual importance values.

48. The article of manufacture defined in claim 26 wherein the method further comprises reformatting the plurality of document image segments to display the document image segments on a target canvas.

49. The article of manufacture defined in claim 26 wherein the method further comprises segmenting the document into the document image segments based on line interspaces and font characteristics.

50. An apparatus comprising:

an analyzer to select a plurality of document image segments from a set of document image segments based on a plurality of attributes that includes semantic importance information and visual importance information for each of the plurality of document image segments;

a merging unit to determine a plurality of positions and a plurality of geometric operations to be performed on the plurality of document image segments according to the plurality of attributes that include semantic importance information and visual importance information, and display constraints.

51. A method comprising:

performing semantic document analysis on a document based on input information;

extracting semantic information from the document based on results of the semantic document analysis;

merging extracted semantic information with extracted visual information;

creating a layout that includes a plurality of document image segments selected from a set of document image segments, dependent on the input information, for a visual representation of the document based on results of merging; and generating the visual representation using the layout, including extracting the plurality of segments of the document and positioning the plurality of segments in the visual representation based on the extracted semantic information.

52. The method defined in claim 51 wherein the input information comprises query information in a user query, and further wherein the layout comprises a query dependent layout.

53. The method defined in claim 51 wherein the document has a first representation and the visual representation is a second representation different than the first representation.

54. An article of manufacture having one or more computer-readable medium having instructions stored therein which, when executed by a system, cause the system to perform a method comprising:

performing semantic document analysis on a document;

extracting semantic information from the document based on results of the semantic document analysis;

merging extracted semantic information with extracted visual information;

creating a layout that includes a plurality of document image segments selected from a set of document image segments, dependent on the input information, for a visual representation of the document based on results of merging; and generating the visual representation using the layout, including extracting the plurality of segments of the document and positioning the plurality of segments in the visual representation based on the extracted semantic information.

55. The article of manufacture defined in claim 54 wherein the input information comprises query information in a user query, and further wherein the layout comprises a query dependent layout.

56. The article of manufacture defined in claim 54 wherein the document has a first representation and the visual representation is a second representation different than the first representation.

57. A method comprising:

generating a plurality of image segments from a document having a first representation, the plurality of image segments having a plurality of attributes that include a semantic importance indication information and visual importance indication information for each of the plurality of image segments;

performing a plurality of operations on one or more image segments of the plurality of image segments selected based on associated semantic importance information and visual importance information to generate processed image segments; and displaying the processed image segments on a target canvas as a second representation, different than the first representation, the second representation including semantically important content from the document determined based on the semantic importance information and visual importance information.

58. The method defined in claim 57 further comprising determining a position of at least one of the plurality of image segments based on associated attribute information, including semantic importance information.

59. An article of manufacture having one or more computer-readable medium having instructions stored therein which, when executed by a system, cause the system to perform a method comprising:

generating a plurality of image segments from a document having a first representation, the plurality of image segments having a plurality of attributes that include a semantic importance indication information and a visual importance information for each of the plurality of image segments;

performing a plurality of operations on one or more image segments of the plurality of image segments selected based on associated semantic and visual importance information to generate processed image segments; and displaying the processed image segments on a target canvas as a second representation, different than the first representation, the second representation including semantically important content from the document determined based on the semantic importance information and visual importance information.

60. The article of manufacture defined in claim 59 wherein the method further comprises determining a position of at least one of the plurality of image segments based on associated attribute information, including semantic importance information.

61. A method comprising:

choosing a set of areas in a document for inclusion in, and prior to display on, a target display based on semantic importance information and visual importance information associated with each area in the set of areas;

determining whether the set of areas chosen for inclusion in a target display is to be updated;

converting absolutely or relatively positioned areas to absolute locations on the target display if the set of areas is not to be updated; and generating an output list of instructions to operate on the document, the output list of instructions specifying the set of areas chosen and the absolute locations created or a result of converting absolutely or positioned areas.

62. An article of manufacture having one or more computer-readable medium having instructions stored therein which, when executed by a system, cause the system to perform a method comprising:

choosing a set of areas in a document for inclusion in, and prior to display on, a target display based on semantic importance information and visual importance information associated with each area in the set of areas;

determining whether the set of areas chosen for inclusion in a target display is to be updated;

converting absolutely or relatively positioned areas to absolute locations on the target display if the set of areas is not to be updated; and generating an output list of instructions to operate on the document, the output list of instructions specifying the set of areas chosen and the absolute locations created or a result of converting absolutely or positioned areas.

* * * * *